Nov. 26, 1935.  G. A. LYON  2,022,131
COMBINATION FENDER WELL TIRE HOLDING AND COVERING MEANS
Original Filed April 1, 1931   2 Sheets-Sheet 1
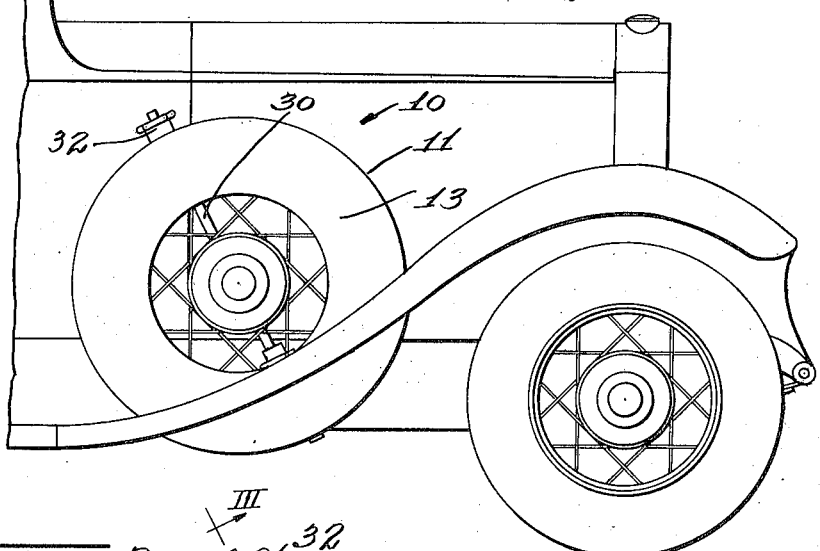
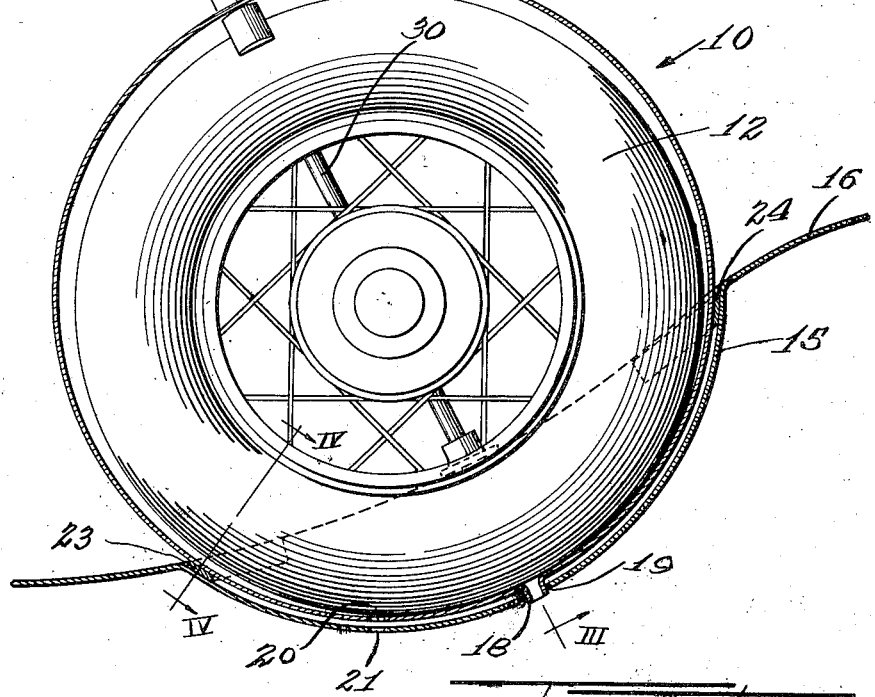
Inventor
George Albert Lyon.
By Charles W. Hills Attys.

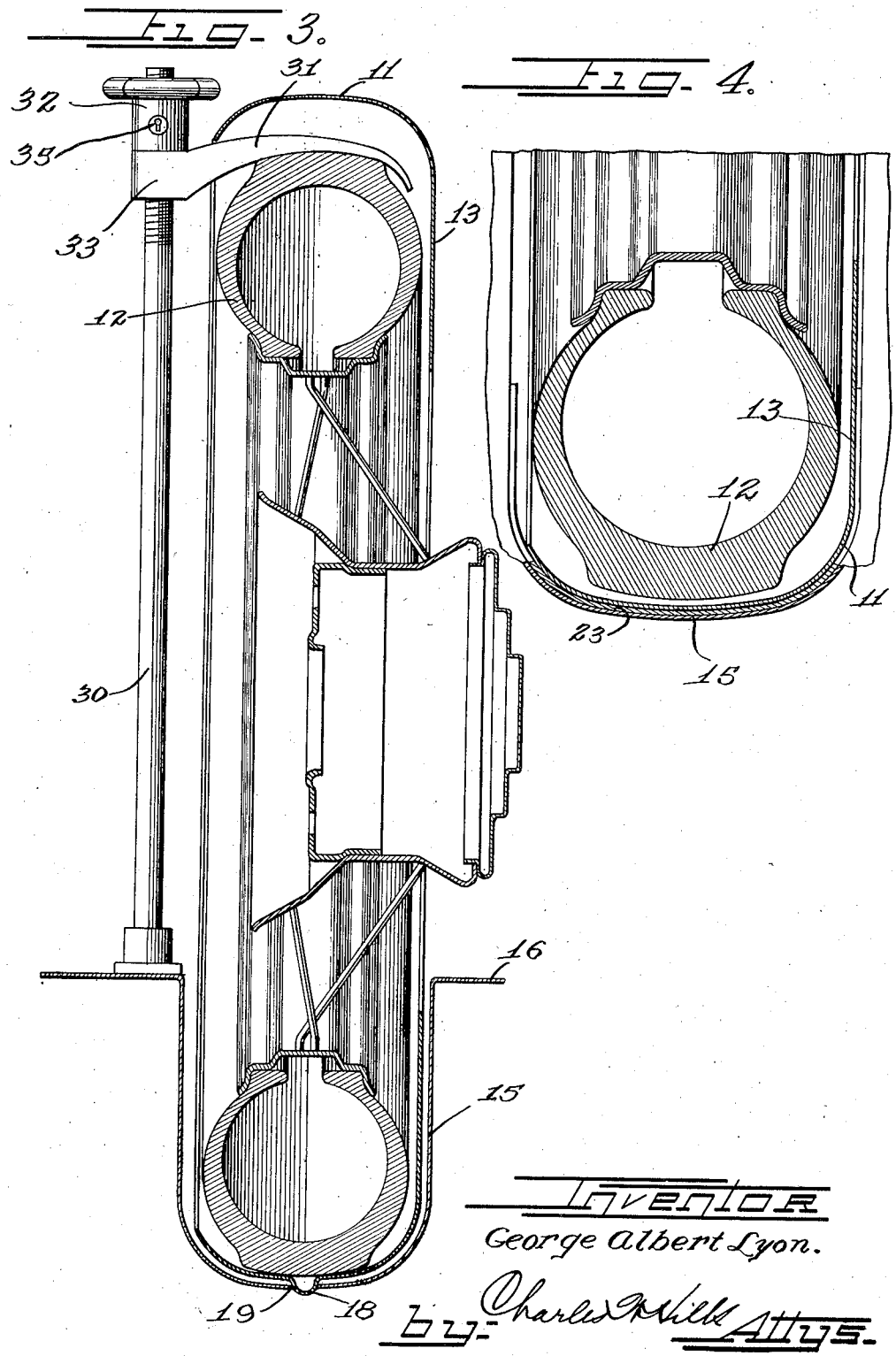

Patented Nov. 26, 1935

2,022,131

UNITED STATES PATENT OFFICE 2,022,131

COMBINATION FENDER WELL TIRE
HOLDING AND COVERING MEANS

George Albert Lyon, Detroit, Mich., assignor to Lyon Incorporated, Asbury Park, N. J., a corporation of Delaware Application April 1, 1931, Serial No. 526,880
Renewed November 14, 1934

7 Claims. (Cl. 224—29)

This invention relates to tire covers and more particularly to a protective cover for a spare tire mounted in a fender well of an automotive vehicle.

It is the object of this invention to utilize the means for clamping and locking a spare tire in a fender well as a means for also preventing unauthorized removal of a tire cover from the spare tire disposed in the fender well.

In accordance with the general features of this invention, the tire cover is applied to the spare tire before it is placed in the fender well, and after both the cover and tire are placed in the fender well the arm of the clamping means is inserted at the top of the tire between the tire and the cover for forcing the cover downwardly into the well whereby both the cover and the tire are clamped and locked in position in the well against unauthorized removal.

Other objects and features of this invention will more fully appear from the following detailed description taken in connection with the accompanying drawings in which Figure 1 illustrates a tire and cover disposed in a fender well of an automobile and secured thereto by the tire clamping means;

Figure 2 is a vertical sectional view taken through the tire cover and fender well shown in Figure 1 illustrating the manner in which both the tire cover and tire are clamped in position in the fender well;

Figure 3 is a sectional view taken on substantially the line III—III of Figure 2 looking in the direction indicated by the arrows; and Figure 4 is a fragmentary sectional view taken on substantially the line IV—IV of Figure 2 looking downwardly.

The tire cover which may be made of metal or any other suitable material is designated generally by the reference character 10 and includes a rim portion 11 for covering the outer periphery of the tire 12 and a side portion 13 for covering the outer side wall of the tire. The cover is adapted to be mounted on the tire by sliding it axially thereon.

Now, due to the fact that the cover 10 is slightly larger than the tire 12 disposed therein, it necessarily follows that when both the cover and the tire are disposed in the fender well 15 formed in a fender 16 of an automotive vehicle the tire will assume an eccentric position with reference to the cover 10 as best shown in Figure 2.

In order to hold the cover 10 in a centralized or given position with reference to the fender well the rim portion 11 of the cover may be provided with a laterally extending projection or nubbin 18 adapted to fit in an opening 19 formed in the bottom of the fender well 15. Also the cover rim 11 may be provided with a drain opening 20 adapted to align with the drain opening 21 in the fender well (Figure 2) for permitting any water which may enter the fender well or cover to readily drain therefrom. These two openings are disposed at the lowest point of the fender well as is evidenced from Figure 2.

Furthermore in order to cushion the tire cover in the fender well 15, strips of felt or other cushioning means may be disposed at the upper end of the fender well as indicated at 23 and 24. These strips of felt 23 and 24 may be suitably secured to the corresponding portions of the fender well 15 (Figure 2).

At present it is the practice in many automobiles utilizing the fender well type of mounting for spare tires to use a clamping arm mounted on a rod for engaging the top of the tire to firmly clamp the same in place in the fender well. As I have previously pointed out, it is the aim of this invention to utilize that same clamping means for not only clamping the tire in place but for also holding the tire cover in place without in any way marring the outer periphery of the tire cover or in any way subtracting from its appearance.

Referring to Figure 3 it will be observed that a rod 30 is suitably secured to the chassis of the vehicle and has its upper or free end provided with a clamping arm loosely secured to the rod. This arm 31 has its laterally extending portion 35 formed to correspond with the contour of the tread of the tire so as to snugly fit thereover whereby upon the arm 31 being forced downwardly the tire will also be forced downwardly into the well 15. The upper end of the rod 30 is threaded and provided with a nut 32 disposed directly over the hub portion 33 of arm 31 which hub portion is loosely mounted on the rod 30. Obviously by rotating the nut 32 the arm 31 may be forced downwardly into tight clamping engagement with the tire 12. The nut member 32 may also have connected to it any suitable locking means for preventing its rotation by an unauthorized person and such locking means may for example take the form of a conventional lock cylinder 35 adapted to lock the nut against rotation on the upper end of the rod 30. This lock cylinder may include the usual plunger adapted to be operated by a key which plunger may be moved into and out of engagement with the threaded portion of rod 30.

Now it will be evident that the forcing of the clamping arm 31 downwardly by the rotation of the nut 32 not only results in the clamping of the tire 12 in proper position in the fender well 15 but also causes the cover to be clamped in tire protecting position. Needless to say the locking of the nut 32 against rotation once the clamping arm 31 has been brought into proper clamping position not only results in the tire being locked and clamped in the fender well 15 but also results in the tire cover being locked on the tire and against removal therefrom.

Now I desire it understood that although I have illustrated and described in detail the preferred embodiment of my invention, the invention is not to be thus limited but only insofar as defined by the scope and spirit of the appended claims.

I claim as my invention:

1. In an automotive vehicle including a fender well and a spare tire disposed therein, a cover of relatively rigid material on the spare tire including a tread covering portion of such configuration that a space is provided at the top of the tire between said portion and the tread of the tire, and means supported adjacent said fender well and extending into said space and clampingly engaging the tire and forcing the tire and cover thereon downwardly in the fender well to hold the same in proper position in the well.

2. In an automotive vehicle including a fender well and a spare tire disposed therein, a cover of relatively rigid material on the spare tire including a tread covering portion of such configuration that a space is provided at the top of the tire between said portion and the tread of the tire, and means supported adjacent said fender well and extending into said space and clampingly engaging the tire and forcing the tire and cover thereon downwardly in the fender well to hold the same in proper position in the well, said means including a clamping arm of such shape as to be movable into said space and into clamping engagement with the tread of the tire.

3. In an automotive vehicle including a curved fender well and a spare tire disposed therein, a spare tire cover of relatively rigid material including a tread covering portion of such configuration as to fit inside the fender well between the tire and well and to closely conform with the curvature of the well, whereby the weight of the tire holds the cover in place in the well and means for pressing both the cover and tire downwardly in the well to hold them tightly in position in the well and against rattling.

4. In an automotive vehicle including a curved fender well and a spare tire disposed therein, a spare tire cover of relatively rigid material including a tread covering portion of such configuration as to fit inside the fender well between the tire and well and to closely conform with the curvature of the well, whereby the weight of the tire holds the cover in place in the well, and means free of the cover for pressing both the cover and tire downwardly in the well to hold them tightly in position in the well and against rattling.

5. In an automotive vehicle including a curved fender well and a spare tire disposed therein, a spare tire cover of relatively rigid material including a tread covering portion of such configuration as to fit inside the fender well between the tire and well and to closely conform with the curvature of the well, whereby the weight of the tire holds the cover in place in the well, and means for engaging the tire and pressing both the cover and tire downwardly in the well to hold them tightly in position in the well and against rattling.

6. In an automotive vehicle including a curved fender well and a spare tire disposed therein, a spare tire cover of relatively rigid material including a tread covering portion of such configuration as to fit inside the fender well between the tire and well and to closely conform with the curvature of the well, whereby the weight of the tire holds the cover in place in the well, antirattle cushion means between the cover and the well, and means for pressing both the cover and tire downwardly against said cushion means in the well to hold them tightly in position in the well and against rattling.

7. In an automotive vehicle including a curved fender well and a spare tire disposed therein, a spare tire cover of relatively rigid material including a tread covering portion of such configuration as to fit inside the fender well between the tire and well and to closely conform with the curvature of the well, whereby the weight of the tire holds the cover in place in the well, means for pressing both the cover and tire downwardly in the well to hold them tightly in position in the well and against rattling, and means for locking said pressing means against unauthorized movement, whereby to lock both the tire and the cover in the well.

GEORGE ALBERT LYON.